(12) United States Patent
Okamoto et al.

(10) Patent No.: US 6,316,536 B1
(45) Date of Patent: Nov. 13, 2001

(54) POLYARYLENE SULFIDE RESIN COMPOSITION, AND MOLDINGS AND CONNECTORS MADE OF IT

(75) Inventors: Masaya Okamoto; Minoru Senga, both of Ichihara; Koichi Suga; Kenji Seki, both of Sodegaura, all of (JP)

(73) Assignees: Idemitsu Kosan Co., Ltd.; Idemitsu Petrochemical Co. Ltd.; Petroleum Energy Center (PEC), all of Tokyo (JP)

( * ) Notice: Subject to any disclaimer, the term of this patent is extended or adjusted under 35 U.S.C. 154(b) by 0 days.

(21) Appl. No.: 09/306,050

(22) Filed: May 6, 1999

(30) Foreign Application Priority Data

May 28, 1998 (JP) .................................. 10-146774

(51) Int. Cl.$^7$ ............................... C08J 5/10; C08K 3/40; C08L 65/02
(52) U.S. Cl. ............................. 524/494; 492/493
(58) Field of Search .................... 524/492, 493, 524/494

(56) References Cited

U.S. PATENT DOCUMENTS

| | | | | |
|---|---|---|---|---|
| 4,451,644 | * | 5/1984 | Ostlinning et al. | 528/388 |
| 5,789,533 | * | 8/1998 | Yamanaka et al. | 528/388 |

* cited by examiner

*Primary Examiner*—James J. Seidleck
*Assistant Examiner*—U. K. Rajguru
(74) *Attorney, Agent, or Firm*—Oblon, Spivak, McClelland, Maier & Neustadt, P.C.

(57) ABSTRACT

Provided is a polyarylene sulfide resin composition of which the moldings are burred little and which has good mechanical properties and good flow moldability. The composition comprises from 20 to 90% by weight of a polyarylene sulfide and from 10 to 80% by weight of an inorganic filler, and is characterized in that its burrs are on the level of at most 120 μm, that it has a weld strength of at least 50 MPa and that the length of its spiral flow having a thickness of 1 mm is at least 100 mm. Preferably, the polyarylene sulfide to be in the composition has a specific index to the degree of branching and a specific flexural strength.

8 Claims, No Drawings

POLYARYLENE SULFIDE RESIN COMPOSITION, AND MOLDINGS AND CONNECTORS MADE OF IT

BACKGROUND OF THE INVENTION

1. Field of the Invention

The present invention relates to a resin composition comprising a polyarylene sulfide (hereinafter referred to as PAS) and an inorganic filler, and to moldings and connectors made of it. More precisely, the invention relates to a resin composition comprising PAS and an inorganic filler, of which the moldings are burred little and which has high weld strength and good flow moldability, and also to moldings and connectors made of the composition.

2. Description of the Related Art

PAS is known as an engineering plastic with high mechanical strength, good heat resistance and good chemical resistance, and moldings of a resin composition as prepared by mixing and kneading PAS and an inorganic filler have many applications in various fields.

However, it has heretofore been said that the resin composition is defective in that its moldings are burred.

Various methods have been proposed for reducing the burrs around the moldings of the composition. For example, one method comprises thermally crosslinking the resin to thereby introduce many branches into the resin. The method could reduce the burrs around the moldings of the resin composition, but the mechanical properties of the moldings are lowered and the resin composition would produce gas when decomposed (see JP-A 64-9266).

In order to compensate for the defect of the thermally-crosslinked PAS, a branched PAS has been proposed, which is prepared by adding a branching agent such as trichlorobenzene or the like to the reaction system followed by polycondensing the resulting system (see JP-A 51-144497). The strength of the branched PAS could be higher than that of the thermally-crosslinked PAS, but is lower than that of a linear PAS. Therefore, one often hesitates in using the branched PAS in the field of resin moldings that are required to have few burrs and have high strength.

Another branched PAS has been proposed, for which a branching agent is added to the reaction system within a period of about 75 minutes before the completion of polycondensation to give a branched PAS (see JP-A 55-28217), but this is faced with the same problem as above.

Still other techniques have been proposed of compounding PAS with any other resin into composites (see JP-A 4-213357, etc.), or copolymerizing PAS (see JP-A 8-134352, etc.), or modifying PAS (see JP-A 5-170908, etc.). However, these could not still satisfy the requirements of reducing the burrs around the resin moldings and of increasing the mechanical strength of the resin moldings.

In addition to their drawback of giving burrs around their moldings, the resin compositions noted above are further problematic in that their weld strength is low and their fluidity is poor. Therefore, it is desired to solve the problems with those resin compositions.

SUMMARY OF THE INVENTION

The present invention has been made in consideration of the problems noted above, and its object is to provide a resin composition comprising PAS and an inorganic filler, of which the moldings are burred little and which has high weld strength and good flow moldability, and also to provide moldings and connectors made of the composition.

We, the present inventors have assiduously studied the problems noted above, and, as a result, have found out a resin composition comprising PAS and an inorganic filler, of which the moldings are burred little and which has high weld strength and good flow moldability. On the basis of this finding, we have completed the present invention.

Specifically, the invention provides a resin composition comprising PAS and an inorganic filler, and moldings and connectors made of it, which are mentioned below.

1. A polyarylene sulfide resin composition comprising (A) from 20 to 90% by weight of a polyarylene sulfide and (B) from 10 to 80% by weight of an inorganic filler, which is characterized in that its burrs are on the level of at most 120 µm, that it has a weld strength of at least 50 MPa and that the length of its spiral flow having a thickness of 1 mm is at least 100 mm.

2. The polyarylene sulfide resin composition of the above 1, wherein the polyarylene sulfide (A) satisfies the following formulae (1) to (4):

$$N \geq 0.3 \times \log_{10}(\eta_m) + 0.5 \quad (1)$$

$$N \geq 1.10 \quad (2)$$

$$F \geq 57 \times \log_{10}(\eta_m) - 60 \quad (3)$$

$$F \geq 40 \quad (4)$$

where N indicates an index to the degree of branching of the polyarylene sulfide, $\eta_m$ indicates the melt viscosity (unit: Pa·s) of the polyarylene sulfide, and F indicates the flexural strength (unit: MPa) of the polyarylene sulfide.

3. The polyarylene sulfide resin composition of the above 1 or 2, wherein the melt viscosity $\eta_m$ of the polyarylene sulfide (A) falls between 20 and 1500 Pa·s.

4. The polyarylene sulfide resin composition of any one of the above 1 to 3, wherein the inorganic filler is of glass fibers.

5. A molding made of the polyarylene sulfide resin composition of any one of the above 1 to 4.

6. A connector made of the polyarylene sulfide resin composition of any one of the above 1 to 4.

7. A polyarylene sulfide resin (A) to be used in the polyarylene sulfide resin composition of the above 1, which satisfies the following formulae (1) to (4):

$$N \geq 0.3 \times \log_{10}(\eta_m) + 0.5 \quad (1)$$

$$N \geq 1.10 \quad (2)$$

$$F \geq 57 \times \log_{10}(\eta_m) - 60 \quad (3)$$

$$F \geq 40 \quad (4)$$

wherein N indicates an index to the degree of branching of the polyarylene sulfide, $\eta_m$ indicates the melt viscosity (unit: Pa·S) of the polyarylene sulfide, and F indicates the flexural strength (unit: MPa) of the polyarylene sulfide.

The burr, the weld strength and the spiral flow length that are referred to herein for the resin composition are as follows:

Burr

When a resin composition is molded in a mold by introducing its melt into the cavity of the mold, the melt may flow out through the gaps in the mold and solidifies to give burrs as integrated with the resulting resin molding around it. Resin compositions giving fewer burrs around its moldings are said to have better moldability. The burrs of a resin composition maybe determined according to the following method (a).

(a) To determine the burrs of a resin composition, used is Nihon Seiko's J50EP (this is a 50-ton injection-molding machine) equipped with a mold for burr determination. The cavity of the mold has a shape for UL combustion test pieces, and its size is 127×12.7×3.18 mm. The mold is provided with gas-discharging holes having a width of 10 μm at the resin melt flow terminal in the cavity. Concretely, a melt of a resin composition is injected into the cavity at a resin temperature of 320° C. and at a mold temperature of 135° C., and is molded therein, for which the molding condition comprises flow rate control until moldings with no burr are obtained, followed by dwell pressure control (set dwell pressure 20%). In that condition, the resin melt flows out through the holes to form burrs around the moldings, and the length of the burrs is measured. The data are averaged, and the averaged value indicates the degree of the burr of the resin composition tested.

Weld Strength

When a molten resin is molded through injection or extrusion in at least two resin melt flows to be welded into one molding, the welded boundary gives a weld zone. The weld strength indicates the strength at the welded boundary (weld zone) in the molding. Moldings having higher weld strength are said to have better mechanical characteristics. The weld strength may be measured according to the following method (b).

(b) To determine the weld strength of a resin composition, used is Nihon Seiko's J50EP (this is a 50-ton injection-molding machine) equipped with a mold for dumbbell test pieces of ASTM Standard (D-638). Concretely, a melt of a resin composition is injected into the cavity from two gates through the fixed check point for dumbbell test pieces to be formed, at a resin temperature of 320° C. and at a mold temperature of 135° C., and is molded therein, for which the molding condition comprises flow rate control (flow rate 30%) until a part of the top of one resin melt flow butt into a part of the top of another resin melt flow, followed by dwell pressure control (set dwell pressure 30%). On that condition, prepared are dumbbell test pieces each having a weld zone at the center. The thus-prepared test pieces are subjected to a tensile strength test according to ASTM (D-638), in which the tensile strength at break of each test piece is measured. The value thus measured indicates the weld strength of the resin composition tested.

Spiral Flow Length

The spiral flow length means the length of the flow of a molten resin composition having been injected into a spiral flow mold of an injection-molding machine. Resin compositions having a larger value of the spiral flow length are said to have better fluidity. The spiral flow length may be determined according to the following method (c).

(c) To determine the spiral flow length of a resin composition, used is Toshiba Kika's IS30EPN (this is a 30-ton molding machine) equipped with a spiral flow mold for 1 mm-thick sheets. Concretely, a melt of a resin composition is injected into the mold under an injection pressure of 1000 kgf/cm$^2$ (set pressure 49%), at a resin temperature of 320° C. and at a mold temperature of 135° C. and is molded therein, for which the injection time is 10 seconds. The length of the resin flow having been injected on that condition is measured, and this indicates the spiral flow length of the resin composition tested.

The flexural strength, F, the melt viscosity, $\eta_m$, the solution viscosity and the index to the degree of branching (hereinafter referred to as N) of the above PAS are defined as follows:

Flexural Strength, F

PAS is press-molded at 320° C. and under 50 kgf/cm$^2$ into test pieces having a size of 50 mm (length)×2 mm (thickness), and then annealed at 220° C. for 2 hours. The test pieces are subjected to a flexural strength test, in which the span is 40 mm and the test speed is 1.0 mm/min, to measure the flexural strength of PAS.

Melt Viscosity, $\eta_m$

The melt viscosity $\eta_m$, of PAS is measured through capillography, for which the resin temperature is 300° C., the shear rate is 200/sec, the orifice radius is 1 mm and the orifice length is 40 mm.

Solution Viscosity

To measure the solution viscosity of PAS, used is an Ubbelohde's viscometer, for which the solvent is α-chloronaphthalene, the concentration of PAS is 0.4 g/dl, and the temperature is 206° C.

Index to the Degree of Branching, N

The index to the degree of branching, N, of PAS depends on the melt viscosity, η (unit: poise), of PAS and on the shear rate, γ (unit: sec-1), and is represented by the following formula (5) with logη being a function of logγ and logη=f (logγ).

$$N = \frac{1 + \left.\frac{\partial \log \eta_L}{\partial \log \gamma}\right|_{\gamma=200}}{1 + \left.\frac{\partial \log \eta_m}{\partial \log \gamma}\right|_{\gamma=200}} \quad (5)$$

wherein $\eta_L$ indicates the melt viscosity of linear PAS, $\eta_m$ indicates the melt viscosity of branched PAS of which N is intended to be determined, γ indicates the shear rate, and ∂ log η/∂ log γ=γ=200 means the partial differential value at γ=200 (sec$^{-1}$) for the partial differential of log η by log γ, ∂ log η/∂log γ.

In formula (5), the linear PAS is one having the same repetitive units as those of the branched PAS of which N is intended to be determined, and having, when it is a copolymer, the same constituent monomer proportions as those of the branched PAS, and further having the same melt viscosity as that of the branched PAS at a predetermined shear rate (in the present invention, at 200/sec).

For the expression of log η being a function of logγ as log η=f(log γ), the data of melt viscosity are obtained at a plurality of different predetermined shear rates according to the following numerical formulae, and the data at those different points are mathematically processed according to a least square method or the like to thereby express the functional equation as above.

Specifically, the shear rate and the shear stress are the values to be obtained according to the following mathematical formulae, for which is used a capillary rheometer provided with a predetermined cylinder and a predetermined orifice. Concretely, a sample to be tested is extruded out at a predetermined extrusion rate through the orifice, and the load necessary for the sample extrusion is measured. From the thus-measured load, the shear rate and the shear stress are obtained according to the following mathematical formulae:

Shear/Rate/(sec$^{-1}$)={4·(SR)$^2$·(extrusion rate)(mm/sec)}/(10×60× R$^3$), Shear Stress (dyne/cm$^2$)={(load)(kg)·980·10$^3$}/ {π·(SR)·2·L} wherein SR indicates the radius of the cylinder, R indicates the radius of the orifice, L indicates the length of the orifice.

The melt viscosity is represented by the following formula:

Melt/Viscosity/(poise)={(shear/stress)(dyne/cm$^2$)}/{(shear rate)(sec$^{-1}$)}.

DESCRIPTION OF THE PREFERRED EMBODIMENT

The polyarylene sulfide resin composition of the invention comprises (A) from 20 to 90% by weight of a polyarylene sulfide and (B) from 10 to 80% by weight of an inorganic filler, and is characterized in that its burrs as measured according to the method (a) mentioned above are on the level of at most 120 μm, that its weld strength as measured according to the method (b) mentioned above is at least 50 MPa and that the length of its spiral flow having a thickness of 1 mm, as measured according to the method (c) mentioned above, is at least 100 mm.

The invention is described concretely hereinunder.

[I] Polyarylene Sulfide Resin Composition of the Invention:

1. Formulation of the Polyarylene Sulfide Resin Composition of the Invention:

(1) Formulation:

The polyarylene sulfide resin composition of the invention comprises (A) from 20 to 90% by weight of a polyarylene sulfide and (B) from 10 to 80% by weight of an inorganic filler.

In the composition of the invention, the amount of the inorganic filler must fall between 10 and 80% by weight, but preferably between 15 and 70% by weight. If the amount of the inorganic filler therein is smaller than 10% by weight, the dimension stability of the composition will be poor. If, on the other hand, it is larger than 80% by weight, the fluidity of the composition will be greatly lowered and, in addition, the mechanical strength thereof will also be lowered.

(a) PAS for use in the invention:

PAS for use in the invention is not specifically defined, and it may be any regenerated one. In the invention, however, preferred is PAS that satisfies the following requirements.

Preferred PAS for use in the invention satisfies the following relational formulae for the melt viscosity, $\eta_m$, and the value N:

$$N \geq 0.3 \times \log_{10}(\eta_m) + 0.5 \tag{1}$$

$$N \geq 1.10 \tag{2}.$$

More preferably, $$N \geq 0.3 \times \log_{10}(\eta_m) + 0.55 \tag{6}$$

$$N \geq 1.10 \tag{2}.$$

Even more preferably, $$N \geq 0.3 \times \log_{10}(\eta_m) + 0.6 \tag{7}$$

$$N \geq 1.10 \tag{2}.$$

PAS satisfying the above-mentioned relational formulae has a larger value, N, than conventional branched PAS having the same melt viscosity, and has better burr-preventing capabilities than the latter. Conventional branched PAS having a large value N shall have an increased melt viscosity, and, as a result, its moldability, especially injection moldability is poor. Therefore, the conventional branched PAS is disadvantageous in practical use. PAS that satisfies the above-mentioned relational formulae has better burr-preventing capabilities than conventional branched PAS within the melt viscosity range for practicable moldability.

It is preferable that the value N of PAS satisfying the above-mentioned relational formulae is at least 1.10, more preferably from 1.10 to 1.50, even more preferably from 1.20 to 1.45. PAS with N of smaller than 1.10 is unfavorable, since the burr around the moldings could not be reduced to a satisfactory degree. On the other hand, PAS with N of larger than 1.50 will have poor mechanical strength and its stiffness will be low. In addition, its melt viscosity will be too high, and molding it will require severe conditions.

As far as PAS could be molded in any known molding method of, for example, injection molding, extrusion molding, gel molding or the like, its melt viscosity, $\eta_m$, of PAS is not specifically defined, but preferably falls between 20 and 1500 Pa·s, more preferably between 60 and 1000 Pa·s, particularly preferably between 80 and 800 Pa·s. If its melt viscosity, $\eta_m$, is smaller than 20 Pa·s, PAS will be difficult to mold, or even if molded, its moldings could not have good characteristics of PAS including good mechanical properties and heat resistance thereof. On the other hand, if its $\eta_m$ is larger than 1500 Pa·s, PAS will be difficult to mold, or the choice for the molding methods and the molding conditions for PAS will be much limited.

PAS that satisfies the above-mentioned relational formulae (1) and (2), preferably (6) and (2), particularly preferably (7) and (2), shall further satisfy the following formulae:

$$F \geq 57 \times \log_{10}(\eta_m) - 60 \tag{3}$$

$$F \geq 40 \tag{4}$$

More preferably, $$F \geq 57 \times \log_{10}(\eta_m) - 55 \tag{8}$$

$$F \geq 40 \tag{4}.$$

Particularly preferably, $$F \geq 57 \times \log_{10}(\eta_m) - 50 \tag{9}$$

$$F \geq 40 \tag{4}.$$

PAS satisfying the above-mentioned formulae has a larger flexural strength than conventional thermally-crosslinked PAS having the same melt viscosity.

Preferred PAS for use in the invention has a flexural strength of at least 40 MPa, preferably at least 50 MPa, particularly preferably at least 60 MPa. The practical applications of PAS having a flexural strength of smaller than 40 MPa will be much limited.

Preferred PAS for use in the invention has at least 70 mol % of repetitive units of —Ar—S— (where Ar is an aryl group). One typical example of PAS of that type has at least 70 mol % of repetitive units of the following structural formula (I):

$$\left[ -S-\underset{(R^1)_m}{\underset{|}{\bigcirc}}- \right] \tag{I}$$

wherein $R^1$ represents a substituent selected from alkyl and alkoxy groups having at most 6 carbon atoms, phenyl groups, carboxylic acids and their metal salts, amino groups, nitro groups, halogen atoms such as fluorine, chlorine and bromine atoms, and m represents an integer of from 0 to 4. This may have a solution viscosity of from 0.13 to 0.50 dl/g, preferably from 0.15 to 0.45 dl/g, particularly preferably from 0.20 to 0.35 dl/g. The solution viscosity may be measured with an Ubbelohde's viscometer, for which the solvent is a-chloronaphthalene, the concentration of PAS is 0.4 g/dl, and the temperature is 206° C. In addition to the structural units (I), PAS for use in the invention may further have any other comonomer units of metaphenylene sulfide units, orthophenylene sulfide units, p,p'-diphenylene-ketone sulfide units, p,p'-diphenylene-sulfone sulfide units, p,pl-biphenylene sulfide units, p-p'-diphenylene-ether sulfide units, p,p'-diphenylene-methylene sulfide units, p,p'-diphenylene-cumenyl sulfide units, naphthyl sulfide units and the like, in an amount of smaller than 30 mol %. (b) Method for preparing PAS that is preferably used in the invention:

One example of the method for producing PAS that satisfies the above-mentioned relational formulae and is preferably used in the invention is mentioned below.

Concretely, the method for producing PAS is characterized in that a branching agent is added to a prepolymer of PAS having a solution viscosity of from 0.05 to 0.25 dl/g, or to a solution or slurry containing the prepolymer, and optionally a polymerization solvent and a sulfur source are added thereto, and the prepolymer is polycondensed at 230 to 290° C., and in that the solution of the polymerization system is not in a phase-separated condition.

The prepolymer shall have the same composition as PAS which satisfies the above-mentioned relational formulae, except that it has a solution viscosity of from 0.05 to 0.25 dl/g, preferably from 0.07 to 0.20 dl/g, and that it is not branched.

If the prepolymer has a solution viscosity of smaller than 0.05 dl/g and when it is subjected to polycondensation in the manner as above, it will also give PAS having a low molecular weight. As a result, the resulting PAS will have a broadened molecular weight distribution, and, when molded, it will generate gas and the resulting moldings will have poor heat resistance. If, on the other hand, the prepolymer has a solution viscosity of larger than 0.25 dl/g and when it is subjected to polycondensation in the manner as above, it will give PAS having a satisfactorily high molecular weight, but the N value and the strength of the resulting PAS could not be increased so much. As a result, PAS that satisfies the above-mentioned relational formulae could not be obtained.

To prepare the prepolymer, employable is any known method for producing linear PAS such as that of Comparative Example 3 to be mentioned hereinunder. For the purpose of obtaining the prepolymer having any desired solution viscosity according to the known method, the polymerization time and other conditions for the method may be suitably defined.

The polymerization time may vary, for example, depending on the presence or absence of a polymerization promoter and water, but may fall generally between 0.1 and 4 hours, preferably between 0.1 and 2 hours. If the polymerization time is shorter than 0.1 hour, the solution viscosity of the prepolymer prepared will sometimes be smaller than 0.05 dl/g; but if it is longer than 4 hours, the solution viscosity thereof will sometimes be larger than 0.25 dl/g.

The prepolymer is meant to indicate the concept of PAS that exists in the reaction system before a branching agent is added thereto for polycondensation according to the characteristic production method as above, and it is not limited to so-called oligomers only that have a low molecular weight. As the case may be, therefore, the prepolymer could have a molecular weight of such a degree that it may be considered as an ordinary polymer in a sense.

As the branching agent, any and every known one is employable. For example, it includes polyhaloaromatic compounds having at least three halogen substituents such as trichlorobenzenes, tribromobenzenes, tetrachlorobenzenes and others as described in JP-A 56-28217, as well as dihaloanilines and dihalonitrobenzenes. Of those, especially preferred are 1,2,4-trichlorobenzene and 1,3,5-trichlorobenzene.

The amount of the branching agent to be added to the prepolymer, relative to the number of mols of the repetitive units of the prepolymer, may be determined, depending on the intended degree of branching of PAS to be obtained. In general, it may fall between 0.1 and 1.5 mol %, preferably between 0.3 and 1.2 mol %, more preferably between 0.5 and 1.0 mol %. If the amount of the branching agent added is larger than needed, the degree of the branching of the PAS obtained will be unnecessarily large. If so, the moldability of PAS will be poor and, in addition, the strength thereof will be low. On the other hand, if the amount of the branching agent added is too small, the burr-preventing capabilities of the PAS obtained will be poor. If such unfavorable PAS is used in the resin composition of the invention, the composition could not be molded into good moldings.

The polymerization solvent may be any and every known one usable in polymerization to give PAS. For example, organic amide solvents such as those described in JP-A 56-28217 may be used. Of those, preferred is N-methyl-2-pyrrolidone (NMP)

During the polymerization, the polymerization solvent may be added to the polymerization system, depending on the condition of the system. For example, when the prepolymer to be polymerized is solid, the amount of the polymerization solvent to be added thereto must be enough for the polymerization. On the other hand, when the prepolymer is dissolved in a solvent or is in the form of a slurry, adding the polymerization solvent thereto is not always necessary.

In the production method mentioned above, it is desirable that the amount of the polymerization solvent to be in the polymerization solution falls between 2 and 20, more preferably between 3 and 15, in terms of the ratio by mol of the solvent to the number of mols of the repetitive units constituting the prepolymer.

The sulfur source that may be used in the polymerization system may be any and every known one. For example, employable are alkali metal sulfides and alkaline earth metal sulfides such as those described in JP-A 55-28217. Of those, preferred are lithium sulfide and sodium sulfide.

The amount of the sulfur source to be present in the polymerization solution may fall generally between 0 and 10 mol %, but preferably between 0.9 and 6 mol %, relative to the number of mols of the repetitive units constituting the prepolymer. If it is larger than 10 mol %, the prepolymer will be often decomposed through depolymerization or the like.

Further if desired, lithium hydroxide may be added to the polymerization system in an amount of from 0 to 10, preferably from 1 to 5, in terms of the ratio by mol of the compound to the number of mols of the repetitive units constituting the prepolymer.

The polymerization temperature may fall between 230 and 290° C., preferably between 240 and 280° C., more preferably between 250 and 275° C., at which the polymerization solution could have a uniform phase without being separated into different phases during the polymerization. The polymerization temperature may be varied in different stages within the range within which the prepolymer being polymerized and even the product, PAS being produced through the polymerization could be well dissolved in the solvent without being separated into plural phases.

The polymerization time is not specifically defined, but may fall generally between 0.1 and 24 hours, preferably between 0.5 and 10 hours, more preferably between 0.5 and 2 hours. The polymerization time will vary, depending on the polymerization temperature, the catalyst used and other conditions. However, if the time is too long or too short, the strength of the product PAS to be obtained will be lowered and, as the case may be, the product PAS will be partly degraded into compounds having a low molecular weight. If so, the product will contain an increased amount of low-molecular-weight components. Therefore, too long or too short polymerization time is disadvantageous in view of the economical aspect and of the physical properties of the product PAS.

For the purpose of preventing the phase separation in the polymerization solution being polymerized according to the polymerization method noted above and for the purpose of maintaining the uniform phase of the polymerization solution, the temperature shall be set suitably for the polymerization. Apart from this, the amount of the salt to be formed as the side product in the polymerization solution may be reduced, or the amount of water therein may be kept within a suitable range.

For reducing the amount of the salt to be formed as the by-product salt in the polymerization solution, for example, the prepolymer may be washed with a polymerization solvent such as water, NMP or the like, prior to being subjected to polycondensation.

The water content of the polymerization solution is not specifically defined so far as it does not interfere with the effect of the invention. Preferably, however, the water content is desired to be at most 10%, particularly preferably at most 5, relative to 100% by weight of the reaction solution. If the water content is larger than 10%, the polymerization solution will be separated into different phases.

Also preferably, the amount of the dihaloaromatic compound that may be in the polymerization solution just after addition of a branching agent and other additives to the prepolymer is at most 30 mol %, more preferably at most 20 mol %, particularly preferably at most 10 mol %, relative to the sum of the number of mols of the repeating units constituting the prepolymer and the number of mols of the dihaloaromatic compound.

If the amount of the dihaloaromatic compound existing in the polymerization solution is too large, the molecular weight distribution of the final product, PAS, will be broadened to lower the heat resistance of PAS. If so, in addition, the amount of the salt to be produced as the by-product salt in polymerization will increase to separate the polymerization solution into different phases.

In order to prepare a polymerization solution having a reduced amount of a dihaloaromatic compound, the dihaloaromatic compound to give the prepolymer is reacted until the conversion of the dihaloaromatic compound reaches preferably at least 70 mol %, more preferably at least 80 mol %, particularly preferably more than 90 mol %, or, alternatively, the prepolymer is separated through precipitation from the solution containing it and then fully washed with a polymerization solvent such as water, NMP or the like or with an organic solvent such as methylene chloride, acetone or the like.

After completion of the polymerization of the prepolymer, the resulting PAS for use in the invention may be separated from the reaction solution in any known manner. For example, a phase-separating agent such as water or the like may be added to the polymerized mixture, and the mixture is then cooled, whereby granular and/or powdery PAS is separated from the mixture; or after the phase-separating agent such as water or the like is added to the polymerized mixture, the mixture may be kept at a temperature at which PAS is not crystallized out. In the latter case, the PAS phase is separated as a liquid phase, due to the action of the phase-separating agent added, and this may be taken out of the reactor through its bottom.

The thus-collected PAS may be purified in any known method. For example, it may be washed with an organic solvent such as water, NMP or the like, and the washing liquid may be flushed away from the purified PAS.

(c) Inorganic Filler for use in the Invention:

The inorganic filler for use in the invention is not specifically defined, and includes, for example, glass fibers, carbon fibers, aramide fibers, potassium titanate whiskers, silicon carbide whiskers, mica ceramic fibers, wollastonite, mica, talc, silica, alumina, kaolin, clay, silica-alumina, carbon black, calcium carbonate, titanium oxide, lithium carbonate, molybdenum disulfide, graphite, iron oxide, glass beads, calcium phosphate, calcium sulfate, magnesium carbonate, magnesium phosphate, silicon nitride, hydrotalcite, etc. They may be used either singly or as combined.

Along with the inorganic filler, any of various coupling agents such as aminosilane-based, mercaptosilane-based or epoxysilane-based coupling agents, as well as inorganic or organic pigments may be used, if desired. In addition, any other resins may be added to the composition of the invention to such an extent that they do not detract from the properties of the composition.

2. Characterization of the Polyarylene Sulfide Resin Composition of the Invention:

The resin composition of the invention is characterized by the following parameters that may be determined according to the methods mentioned below.

(1) Level of Burr:

It is necessary that the burrs of the resin composition of the invention are on the level of at most 120 $\mu$m, preferably at most 100 $\mu$m, more preferably at most 90 $\mu$m. If the level of the burrs is above 120 $\mu$m, the resin composition could not be applied to the use of precision moldings and others that require high accuracy, and is therefore unfavorable. The burrs are determined according to the method (a) mentioned above.

(2) Weld Strength:

It is necessary that the resin composition of the invention has a weld strength of at least 50 MPa, preferably at least 60 MPa, more preferably at least 70 MPa. If the resin composition has a weld strength of lower than 50 MPa, it is unfavorable since its mechanical strength is low. The weld strength is determined according to the method (b) mentioned above.

(3) Spiral Flow Length:

It is necessary that the length of the spiral flow having a thickness of 1 mm of the resin composition of the invention is at least 100 mm, preferably at least 110 mm, and more preferably at least 120 mm. If the spiral flow length is smaller than 100 mm, the fluidity of the resin composition is low and is unfavorable. The spiral flow length is determined according to the method (c) mentioned above.

3. Method for Producing the Resin Composition of the Invention:

The method for producing the resin composition of the invention is not specifically defined. Preferably, for example, PAS such as that mentioned above may be mixed with an inorganic filler optionally along with any other additives of various coupling agents, stabilizers and the like and with any other resins in any desired ratios, and extruded out through a double-screw extruder to give the resin composition. Regarding the temperature for the production, the extruder may be driven at a temperature falling between 280 and 340° C.

[II] Moldings of the Invention:

Moldings of the invention are obtained through injection molding of the resin composition noted above. The resin temperature for the injection molding may fall, in general, between 280 and 340° C. The moldings of the invention are not specifically defined so far as they are obtained through injection molding, and include, for example, various electrical and electronic components, machine parts, automobile parts, etc.

[III] Connectors of the Invention:

Connectors of the invention are obtained through injection molding of the resin composition noted above. They are joint tools for electrically or mechanically connecting at least two parts or components such as those for electrical and electronic instruments, and their shape and structure are not specifically defined.

The invention is described more concretely with reference to the following Examples, which, however, are not intended to restrict the scope of the invention.

The parameters of the resins and the resin compositions produced herein were measured according to the methods mentioned below.

(1) Melt Viscosity ($\eta_m$):

To determine the melt viscosity ($\eta_m$) of polymers, used was a capillary rheometer (corresponding to Toyo Seiki's Capillograph I Model). The resin temperature was 300° C., the radius of the orifice was 1 mm and the length thereof was 40 mm. The melt viscosity ($\eta_m$) was obtained according to the mathematical method mentioned above.

(2) Index to the Degree of Branching (N):

At least five points of the data of melt viscosity were obtained at different predetermined shear rates, and each logarithmic value of the data was processed according to a least square method to give the functional equation, $\log\eta = f(\log\gamma)$ which indicates that $\log\eta$ is a function of $\log\gamma$. Based on this and according to the method mentioned above, the index to the degree of branching, N, of polymers was obtained.

(3) Flexural Strength (F):

The sample to be tested was press-molded at 320° C. and under 50 kgf/cm$^2$ into test pieces having a size of 50 mm (length)×2 mm (thickness), and then annealed at 220° C. for 2 hours. The test pieces were subjected to a flexural strength test, in which the span was 40 mm and the test speed was 1.0 mm/min. The data obtained indicate the flexural strength of the sample. For the test, used was a Shimadzu Seisakushols precision universal tester (Shimadzu Autograph IS-5000B Model).

(4) Burr:

The level of burrs formed by a resin composition was determined according to the method (a) mentioned above. To measure the length of the burrs formed, used was a universal projector.

(5) Weld Strength:

The weld strength was determined according to the method (b) mentioned above.

(6) Spiral Flow Length:

The spiral flow length was determined according to the method (c) mentioned above.

EXAMPLE 1

540.8 g of lithium sulfide, 5.1 liters of NMP, 1695.7 g of paradichlorobenzene (PDCB), 5.3 g of lithium hydroxide and 318.1 g of water were fed into a 10-liter autoclave of stainless steel, heated up to 260° C. in a nitrogen atmosphere, and reacted for 0.5 hours to give a prepolymer.

The prepolymer was separated from the reaction solution, washed with NMP, water and then acetone in that order, and dried at 120° C. under reduced pressure for 8 hours. The solution viscosity of the prepolymer was 0.14 dl/g.

Next, 51.84 g of the prepolymer, 0.55 g of lithium sulfide, 0.73 g of trichlorobenzene (TCB), 0.6 g of lithium hydroxide, 8.65 g of water and 216.32 g of NMP were fed into a one-liter autoclave, and reacted in a nitrogen atmosphere at 260° C. for 1 hour (for main polymerization) to give a polymer. After the dissolution of the polymerizing components in the polymerization solvent to give the polymerization solution and before the completion of the polymerization, the polymerization solution was not separated into plural phases.

Cooling the polymerization solution gave a precipitate of the polymer formed therein. The polymer was isolated through centrifugation to remove the polymerization solvent. The thus-isolated polymer was washed with NMP, water and then acetone in that order, and dried at 120° C. under reduced pressure for 8 hours. The melt viscosity of the polymer was 364 Pa.s, the value N thereof was 1.49, and the value F thereof was 124 MPa. The data obtained herein are shown in Table 1.

Next, an epoxysilane-based silane coupling agent (Toray Dow Corning's SH6040, its amount is shown in Table 2) was added to the polymer, which was then pelletized at 310° C. through a double-screw extruder while glass fibers (Asahi Fiberglass' JAF591) were added thereto from the downstream side of the extruder. The resulting pellets were tested for the burr, the weld strength and the spiral flow length. The data obtained are shown in Table 2.

EXAMPLE 2

A polymer was prepared in the same manner as in Example 1, except that the amount of lithium sulfide added to the prepolymer was 0.48 g and the amount of TCB added thereto was 0.64 g. The melt viscosity of the polymer prepared herein was 127 Pa-s, the value N thereof was 1.23, and the value F thereof was 80 MPa. The data obtained are shown in Table 1.

In the same manner as in Example 1, the polymer was pelletized and the resulting pellets were tested. The data obtained are shown in Table 2.

EXAMPLE 3

A polymer was prepared in the same manner as in Example 1, except that the time for producing the prepolymer was 1 hour, that the prepolymer having a solution viscosity of 0.17 dl/g was polycondensed to give the polymer, and that the amount of lithium sulfide added to the prepolymer was 0.34 g and the amount of TCB added thereto was 0.45 g. The melt viscosity of the polymer prepared herein was 243 Pa.s, the value N thereof was 1.30, and the value F thereof was 102 MPa. The data obtained are shown in Table 1.

In the same manner as in Example 1, the polymer was pelletized and the resulting pellets were tested. The data obtained are shown in Table 2.

EXAMPLE 4

A polymer was prepared in the same manner as in Example 1, except that the time for producing the prepolymer was 0.1 hours, that the prepolymer having a solution viscosity of 0.11 dl/g was polycondensed to give the polymer, and that the amount of lithium sulfide added to the prepolymer was 0.75 g and the amount of TCB added thereto was 0.91 g. The melt viscosity of the polymer prepared herein was 135 Pa.s, the value N thereof was 1.33, and the value F thereof was 76 MPa. The data obtained are shown in Table 1.

In the same manner as in Example 1, the polymer was pelletized and the resulting pellets were tested. The data obtained are shown in Table 2.

EXAMPLE 5

A polymer was prepared in the same manner as in Example 1, except that 0.83 g of an additional component, thiophenol, was added to the prepolymer. The melt viscosity of the polymer prepared herein was 111 Pa.s, the value N thereof was 1.18, and the value F thereof was 82 MPa. The data obtained are shown in Table 1.

In the same manner as in Example 1, the polymer was pelletized and the resulting pellets were tested. The data obtained are shown in Table 2.

EXAMPLE 6

A polymer was prepared in the same manner as in Example 1, except that the time for the main polymerization of the prepolymer was 0.5 hours. The melt viscosity of the polymer prepared herein was 135 Pa.s, the value N thereof was 1.33, and the value F thereof was 76 MPa. The data obtained are shown in Table 1.

In the same manner as in Example 1, the polymer was pelletized and the resulting pellets were tested. The data obtained are shown in Table 2.

EXAMPLE 7

A polymer was prepared in the same manner as in Example 1, except that the amount of TCB added to the prepolymer was 0.45 g and that the time for the main polymerization of the prepolymer was 2 hours. The melt viscosity of the polymer prepared herein was 364 Pa.s, the value N thereof was 1.32, and the value F thereof was 72 MPa. The data obtained are shown in Table 1.

In the same manner as in Example 1, the polymer was pelletized and the resulting pellets were tested. The data obtained are shown in Table 2.

EXAMPLE 8

A polymer was prepared in the same manner as in Example 1, except that the amount of lithium hydroxide added to the prepolymer was 0.24 g. The melt viscosity of the polymer prepared herein was 236 Pa.s, the value N thereof was 1.38, and the value F thereof was 104 MPa. The data obtained are shown in Table 1.

In the same manner as in Example 1, the polymer was pelletized and the resulting pellets were tested. The data obtained are shown in Table 2.

EXAMPLE 9

A polymer was prepared in the same manner as in Example 1, except that the amount of TCB added to the prepolymer was 0.54 g. The melt viscosity of the polymer prepared herein was 696 Pa.s, the value N thereof was 1.44, and the value F thereof was 118 MPa. The data obtained are shown in Table 1.

In the same manner as in Example 1, the polymer was pelletized and the resulting pellets were tested. The data obtained are shown in Table 2.

EXAMPLE 10

The polymer of Example 1 was pelletized and tested in the same manner as in Example 1, except that the epoxysilane-based silane coupling agent (Toray Dow Corning's SH6040) was not added thereto. The data obtained are shown in Table 2.

COMPARATIVE EXAMPLE 1

110.26 g of PDCB, 34.46 g of lithium sulfide, 1.63 g of TCB, 24.53 g of water and 334.21 g of NMP were fed into a one-liter autoclave, and reacted in a nitrogen atmosphere at 260° C. for 3 hours to prepare a polymer.

The polymer was separated from the reaction solution, washed with NMP, water and then acetone in that order, and dried at120° C. underreduced pressure for 8 hours. The melt viscosity of the polymer prepared herein was 179 Pa.s, the value N thereof was 1.40, and the value F thereof was 41 MPa. The data obtained are shown in Table 1.

In the same manner as in Example 1, the polymer was pelletized and the resulting pellets were tested. The data obtained are shown in Table 2.

COMPARATIVE EXAMPLE 2

A polymer was prepared in the same manner as in Comparative Example 1, except that the amount of TCB used was 0.69 g and that of water used was 10.09 g. The melt viscosity of the polymer prepared herein was 245 Pa.s, the value Nthereof was 1.30, and the value F thereof was 58 MPa. The data obtained are shown in Table 1.

In the same manner as in Example 1, the polymer was pelletized and the resulting pellets were tested. The data obtained are shown in Table 2.

COMPARATIVE EXAMPLE 3

A polymer was prepared in the same manner as in Comparative Example 1, except that TCB was not used but the amount of water used was 10.09 g. The melt viscosity of the polymer prepared herein was 100 Pa.s, the value N thereof was 1.01, and the value F thereof was 112 MPa. The data obtained are shown in Table 1.

In the same manner as in Example 1, the polymer was pelletized and the resulting pellets were tested. The data obtained are shown in Table 2.

COMPARATIVE EXAMPLE 4

A polymer was prepared in the same manner as in Comparative Example 1, except that 1.63 g of TCB was added to the reaction system at 260° C. after 1 hour from the start of the reaction, and that the reaction was continued further for one hour. The melt viscosity of the polymer prepared herein was 189 Pa.s, the value N thereof was 1.34, and the value F thereof was 55 MPa. The data obtained are shown in Table 1.

In the same manner as in Example 1, the polymer was pelletized and the resulting pellets were tested. The data obtained are shown in Table 2.

COMPARATIVE EXAMPLE 5

A polymer of Toray-Phillips Petrochemical's M2588 was pelletized and tested in the same manner as in Example 1. The data obtained are shown in Table 2.

COMPARATIVE EXAMPLE 6

Kureha Chemical Industry's Fortron KPS was used as a polymer, and the polymer was pelletized and tested in the same manner as in Example 1. The data obtained are shown in Table 2.

As described in detail hereinabove, the advantages of the polyarylene sulfide resin composition of the invention are that the moldings of the composition are burred little and that the composition has high weld strength and good flow moldability. Therefore, the composition is favorably used as molding materials for injection molding to give various moldings including precision moldings, connectors, etc.

While the invention has been described in detail and with reference to specific embodiments thereof, it will be apparent to one skilled in the art that various changes and modifications can be made therein without departing from the spirit and scope thereof.

What is claimed is:

1. A polyarylene sulfide resin composition comprising (A) from 20 to 90% by weight of a polyarylene sulfide and (B) from 10 to 80% by weight of an inorganic filler, wherein a mold of said composition has burrs of length of at most 120 $\mu$m and a weld strength of at least 50 MPa, wherein said composition in molten form has a length of its spiral flow having a thickness of 1 mm at least 100 mm.

TABLE 1

|  | Phase Separation | Flexural Branching Agent | $\eta$ of Prepolymer | $\log_{10}$ ($\eta$m) | Value N | Flexural Strength (MPa) |
| --- | --- | --- | --- | --- | --- | --- |
| Example 1 | Not found | Added | 0.14 | 2.56 | 1.49 | 124 |
| Example 2 | Not found | Added | 0.14 | 2.10 | 1.23 | 80 |
| Example 3 | Not found | Added | 0.17 | 2.39 | 1.30 | 102 |
| Example 4 | Not found | Added | 0.11 | 2.13 | 1.33 | 76 |
| Example 5 | Not found | Added | 0.14 | 2.04 | 1.18 | 82 |
| Example 6 | Not found | Added | 0.14 | 2.13 | 1.33 | 76 |
| Example 7 | Not found | Added | 0.14 | 2.29 | 1.32 | 72 |
| Example 8 | Not found | Added | 0.14 | 2.37 | 1.38 | 104 |
| Example 9 | Not found | Added | 0.17 | 2.84 | 1.44 | 118 |
| Comparative Example 1 | Found | TCB | — | 2.25 | 1.40 | 41 |
| Comparative Example 2 | Found | TCB | — | 2.39 | 1.30 | 58 |
| Comparative Example 3 | Found | Not added | — | 2.05 | 1.01 | 112 |
| Comparative Example 4 | Found | TCB | — | 2.28 | 1.34 | 55 |

TCB: Trichlorobenzene, $\eta$: Solution viscosity (unit: dl/g), $\eta$m: Melt viscosity (unit: Pa.s).

TABLE 2

|  | PPS (wt. pts) | GF (wt. pts.) | Coupling Agent (wt. pts.) | Burr ($\mu$m) | Weld Strength (MPa) | SFL (mm) |
| --- | --- | --- | --- | --- | --- | --- |
| Example 1 | 60 | 40 | 0.6 | 75 | 87 | 120 |
| Example 2 | 60 | 40 | 0.6 | 90 | 64 | 150 |
| Example 3 | 60 | 40 | 0.6 | 80 | 77 | 135 |
| Example 4 | 60 | 40 | 0.6 | 85 | 60 | 145 |
| Example 5 | 60 | 40 | 0.6 | 110 | 65 | 180 |
| Example 6 | 60 | 40 | 0.6 | 90 | 57 | 145 |
| Example 7 | 60 | 40 | 0.6 | 90 | 57 | 140 |
| Example 8 | 60 | 40 | 0.6 | 80 | 83 | 135 |
| Example 9 | 60 | 40 | 0.6 | 80 | 86 | 100 |
| Example 10 | 60 | 40 | 0 | 80 | 80 | 125 |
| Comparative Example 1 | 60 | 40 | 0.6 | 120 | 35 | 138 |
| Comparative Example 2 | 60 | 40 | 0.6 | 100 | 40 | 135 |
| Comparative Example 3 | 60 | 40 | 0.6 | 280 | 85 | 180 |
| Comparative Example 4 | 60 | 40 | 0.6 | 110 | 40 | 135 |
| Comparative Example 5 | 100 | 68 | 1.7 | 110 | 85 | 90 |
| Comparative Example 6 | 100 | 70 | 1 | 135 | 75 | 200 |

PPS: Polyarylene sulfide, GF: Glass fibers (Asahi Fiberglass' JAF591), SFL: Spiral flow length.

2. The polyarylene sulfide resin composition as claimed in claim 1, wherein the polyarylene sulfide (A) satisfies the following formulae (1) to (4):

$$N \geq 0.3 \times \log_{10}(\eta_m) + 0.5 \qquad (1)$$

$$N \geq 1.10 \qquad (2)$$

$$F \geq 57 \times \log_{10}(\eta_m) - 60 \qquad (3)$$

$$F \geq 40 \qquad (4)$$

where N indicates an index to the degree of branching of the polyarylene sulfide, $\eta_m$ indicates the melt viscosity (unit: Pa.s) of the polyarylene sulfide, and F indicates the flexural strength (unit: MPa) of the polyarylene sulfide.

3. The polyarylene sulfide resin composition as claimed in claim 1, wherein the melt viscosity $\eta_m$ of the polyarylene sulfide (A) falls between 20 and 1500 Pa.s.

4. The polyarylene sulfide resin composition as claimed in claim 1, wherein the inorganic filler comprises glass fibers.

5. A molding made of the polyarylene sulfide resin composition of claim 1.

6. A connector made of the polyarylene sulfide resin composition of claim 1.

7. The polyarylene sulfide resin composition as claimed in claim 1, wherein the polyarylene sulfide (A) has at least 70 mol % of repetitive units of —Ar—S—, wherein Ar is an aryl group.

8. The polyarylene sulfide resin composition as claimed in claim 7, wherein the polyarylene sulfide (A) has at least 70 mol % of repetitive units of the following structural formula (I):

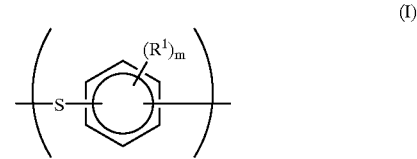

wherein $R^1$ represents a substituent selected from the group consisting of alkyl and alkoxy groups having at most 6 carbon atoms, phenyl groups, carboxylic acids and their metal salts, amino groups, nitro groups, and halogen atoms; and m represents an integer of from 0 to 4, and one or more other comonomer units in an amount of smaller than 30 mol % and selected from the group consisting of metaphenylene sulfide units, orthophenylene sulfide units, p,p'-diphenylene-ketone sulfide units, p,p'-diphenylene-sulfone sulfide units, p,p'-biphenylene sulfide units, p-p'-diphenylene-ether sulfide units, p,p'-diphenylene-methylene sulfide units, p,p'-diphenylene-cumenyl sulfide units, and naphthyl sulfide units.

\* \* \* \* \*